United States Patent
Moore et al.

(10) Patent No.: US 8,411,335 B1
(45) Date of Patent: Apr. 2, 2013

(54) DOCUMENT PROCESSING SYSTEM AND DOCUMENT TRANSPORT / CAMERA INTERFACE

(75) Inventors: Michael J. Moore, Beverly Hills, MI (US); John C Gudenburr, Canton, MI (US); Sammy C. Hutson, Novi, MI (US)

(73) Assignee: Burroughs, Inc.

(*) Notice: Subject to any disclaimer, the term of this patent is extended or adjusted under 35 U.S.C. 154(b) by 1236 days.

(21) Appl. No.: 11/653,697

(22) Filed: Jan. 16, 2007

(51) Int. Cl.
*H04N 1/04* (2006.01)
*G06K 7/00* (2006.01)

(52) U.S. Cl. .................... 358/496; 382/312

(58) Field of Classification Search .......... 358/474, 358/475, 496, 498, 482, 494, 486; 250/200, 250/559.05, 559.06; 271/3.08, 3.01, 3.14, 271/8.1
See application file for complete search history.

(56) References Cited

U.S. PATENT DOCUMENTS

| | | | |
|---|---|---|---|
| 6,178,274 B1* | 1/2001 | Youda et al. | 382/312 |
| 7,019,873 B2* | 3/2006 | Tohyama et al. | 358/496 |
| 2002/0066994 A1* | 6/2002 | Nakano et al. | 271/121 |
| 2003/0117660 A1* | 6/2003 | Matsumoto | 358/400 |
| 2005/0157319 A1* | 7/2005 | Mizuhashi et al. | 358/1.9 |
| 2005/0286092 A1* | 12/2005 | Choi | 358/474 |
| 2007/0081212 A1* | 4/2007 | Tonami et al. | 359/197 |

FOREIGN PATENT DOCUMENTS

| | | | |
|---|---|---|---|
| JP | 2001-119530 | * | 4/2001 |
| JP | 2005-123675 | * | 5/2005 |
| JP | 2006-270272 | * | 10/2006 |

\* cited by examiner

*Primary Examiner* — Jerome Grant, II
(74) *Attorney, Agent, or Firm* — Honigman Miller Schwartz and Cohn LLP

(57) ABSTRACT

A document processing system includes a feeder stage for feeding documents and a transport stage downstream of the feeder stage for receiving the fed documents. The transport stage includes a document transport track defining a document transport path along which the documents are conveyed. The transport stage further includes an image camera located along the document transport track for performing document imaging. The document transport track includes a camera window at the image camera to allow the image camera to view passing documents. The camera window is positioned proud into the document transport path to facilitate wiping of the camera window with the passing documents.

12 Claims, 3 Drawing Sheets

DOCUMENT PROCESSING SYSTEM AND DOCUMENT TRANSPORT / CAMERA INTERFACE

BACKGROUND OF THE INVENTION

1. Field of the Invention

The invention relates to document processing, and to document imaging. The invention further relates to document processing systems of the type in which a large number of documents are rapidly, continuously, and singly transported past one or more imaging cameras.

2. Background Art

A typical document processing system includes a feeder and a separator in the document-feeding portion of the system, and a series of roller pairs or belts in the document-transporting portion of the system. In the feeding portion of the system, the feeder acts with the separator to feed documents singly, in order, from a stack. In the transporting portion of the system, the roller pairs and/or belts convey the documents, one at a time, past other processing devices such as readers, printers, and sorters that perform operations on the documents. The feeder is typically a feed wheel, but may take other forms. The separator may be a wheel, but also may take other forms such as a belt. Further, the components in the transporting portion of the system may take a variety of forms.

In document processors, throughput is measured by the number of items processed in a given time. Accordingly, in the event that poor performance of any components leads to the need to reprocess documents, throughput is degraded.

Banks, credit unions, and other financial institutions use document processing systems to regularly process checks, deposit slips, and other types of bank documents in order to execute financial transactions efficiently. Document processing systems have therefore become quite prevalent in the industry. Typically, information is printed on these documents in magnetic ink which can be read both by the human eye and a computer. This form of printing is read by a process called magnetic ink character recognition (MICR). As part of the recognition process, a MICR magnetic read head is used to read the information printed on the document.

In addition to performing magnetic ink character recognition (MICR) on documents, document processing systems also implement optical character recognition (OCR) on documents. In order to perform optical character recognition (OCR), optical imaging cameras are used to image the passing documents. Further, in some applications, document processing systems capture front and/or rear images of passing documents using one or more image cameras.

In a document processing system wherein a large number of documents are rapidly, continuously, and singly transported past one or more imaging cameras, a major problem for image quality and usability is the build up of paper dust in the optical path of the image cameras. The documents shed paper dust due to frictional forces that are applied to the documents as they are propelled down the transport path.

In a conventional arrangement, the camera views the document through a glass window in the document transport track. This window is recessed back from the inside wall of the document track to avoid contact with documents, and to prevent the leading edge of the document from catching on the front of the window.

This existing arrangement creates a cavity for dust accumulation. This dust build up can be so great in existing document processing systems that it will result in image quality and usability issues. Dust can create streaks in the image which may cause areas of the image to be unreadable by both human operators and optical character recognition (OCR) algorithms. If this dust is allowed to accumulate, it will lead to the degradation of the image and optical character recognition performance of the system. This degradation will lead to expensive reprocessing of documents. In order to avoid reprocessing of documents, operators are currently required to clean the camera glass on a continual basis.

SUMMARY OF INVENTION

It is an object of the invention to provide an improved document processing system and document transport/camera interface.

The invention comprehends a document processing system wherein the transporting portion of the system includes an image camera for performing document imaging. The document transport arrangement includes drive and pinch rollers upstream and downstream of the image camera. The preferable positioning of the drive and pinch rollers is as close as possible to the image camera. The image camera views a document through a window, preferably made of glass, in the document transport track.

According to the invention, the camera window is bonded on the optical path to form the document transport/camera interface. The glass has a shallow lead-in angle ground on the upstream side to prevent upset of a passing document; the camera interface is set in proud into the document path of the transport.

A typical document path width is between 0.040 and 0.150 inches. In operation of the document processing system, the improved document transport/camera interface reduces dust build up at the camera glass.

In a preferred embodiment, the document track/camera interface functions in the following manner. As a document passes the image camera, the document enters the downstream drive and pinch rollers. If the document does not precisely enter the exact pinch point between the two rollers, the result is a momentary shock to the document which sends a ripple along the length of the document, which wipes the document across the image camera glass, thereby preventing dust accumulation.

In the preferred embodiment, there are multiple ways that the document track/camera interface functions to wipe the camera glass. In addition to the wiping action caused by the momentary shock to the document when the document does not precisely enter the exact pinch point between the two downstream rollers, another way that the arrangement prevents dust build up is the release of the document from the upstream drive and pinch roller pair. As the document is released, the trailing end of the document is set free of the spring force of the upstream pinch roller and this release action causes the document to whip the trailing edge within the document track to wipe the camera glass. Further, in the preferred embodiment, the upstream drive and pinch roller pair are slightly offset to bias the document towards the angled lead-in on the camera window glass to provide further wiping action to prevent paper dust build up.

It is appreciated that it is not necessary for every document to wipe the track interface of the optical path. Embodiments of the invention reduce dust build up at the camera glass as long as the occasional document wipes the glass. For example, in a document processing system wherein a large number of documents are rapidly, continuously, and singly transported past the image camera, the construction of the document transport/camera interface will assure that enough documents wipe the glass to reduce dust build up. In accordance with the invention, the document processing system may include any number of image cameras constructed with a document transport/camera interface in accordance with the invention. Advantageously, dust accumulation is reduced, avoiding the degradation of image and optical character recognition performance of the system that is typically associated with dust build up. This reduces the expensive reprocessing of documents, and reduces the requirement for the operator to clean the camera glass on a continual basis, resulting in increased throughput.

DETAILED DESCRIPTION OF THE PREFERRED EMBODIMENTS

Figure 1:
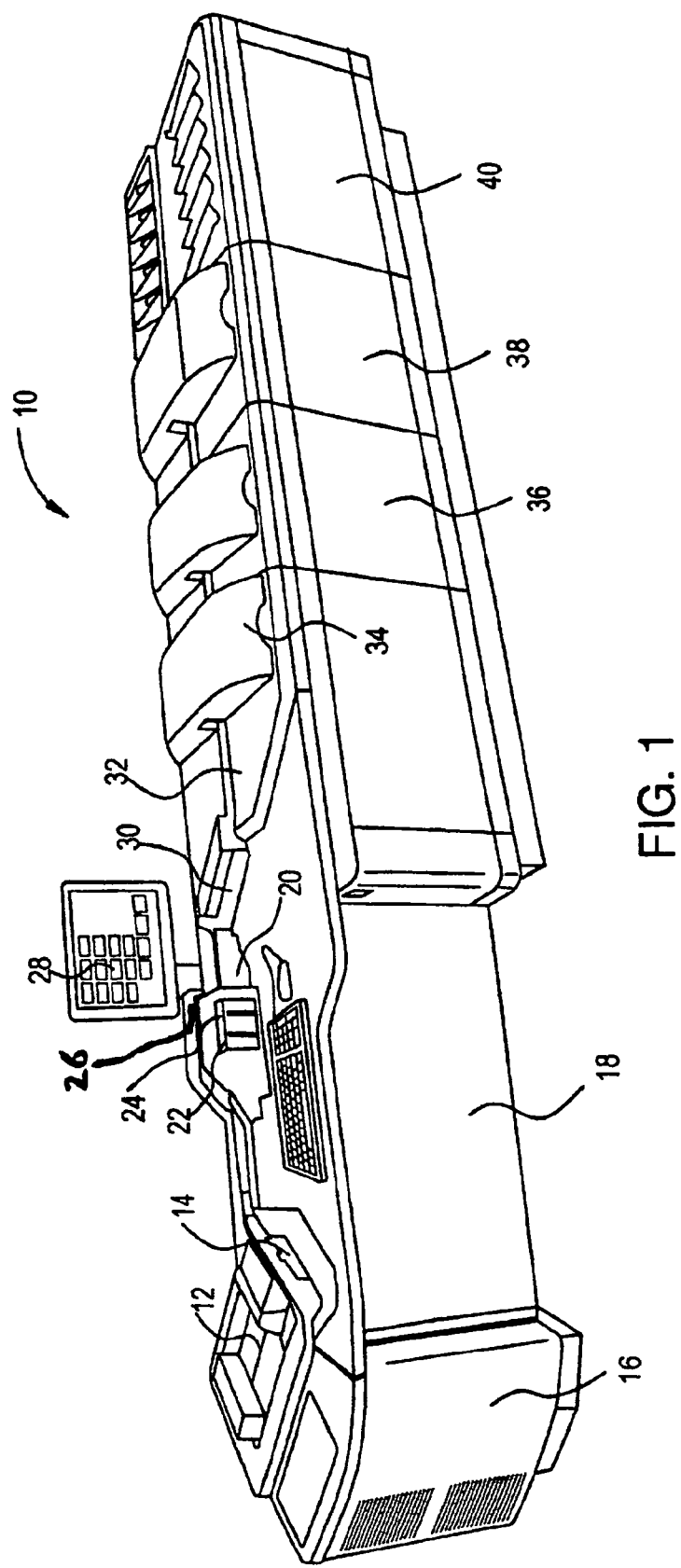
FIG. 1 illustrates a document processing system for feeding and transporting documents made in accordance with the preferred embodiment of the invention.

FIG. 1 illustrates a document processing system for feeding and transporting documents at 10. System 10 includes a primary feeder 12 and a secondary feeder 14. Cabinet 16 houses a computer running software for system 10. System 10 further includes removable kneewell panel 18. The feeders act to separate and feed documents singly, in order, from a stack. The remainder of the system is the transporting portion of the system, which includes a number of roller pairs and/or belts to convey the documents, one at a time, through a track past other processing devices that perform operations on the documents.

As shown in FIG. 1, a number of processing devices are located in the transporting portion of the system 10. Magnetic ink character recognition (MICR) reader 20 and optical character recognition (OCR) reader 22 are located in the document track following secondary feeder 14. As well, upstream imaging devices 24 and 26 image the front side and rear side of each passing document. The operator display is indicated at 28.

With continuing reference to FIG. 1, system 10 further includes a post-read view station 30, and a low-speed document encoder 32. As well, a multi jet endorser (MJE) is located at 34. Further down the document track, an amount-only or full-field high-speed encoder 36 and downstream imager 38 process the passing documents. Finally, a 12-pocket stacker module 40 is provided for the actual sorting of the documents into pockets.

FIG. 1 illustrates an exemplary document processing system. It is appreciated that embodiments of the invention may be employed in a variety of different types of document processing systems.

Figure 2:
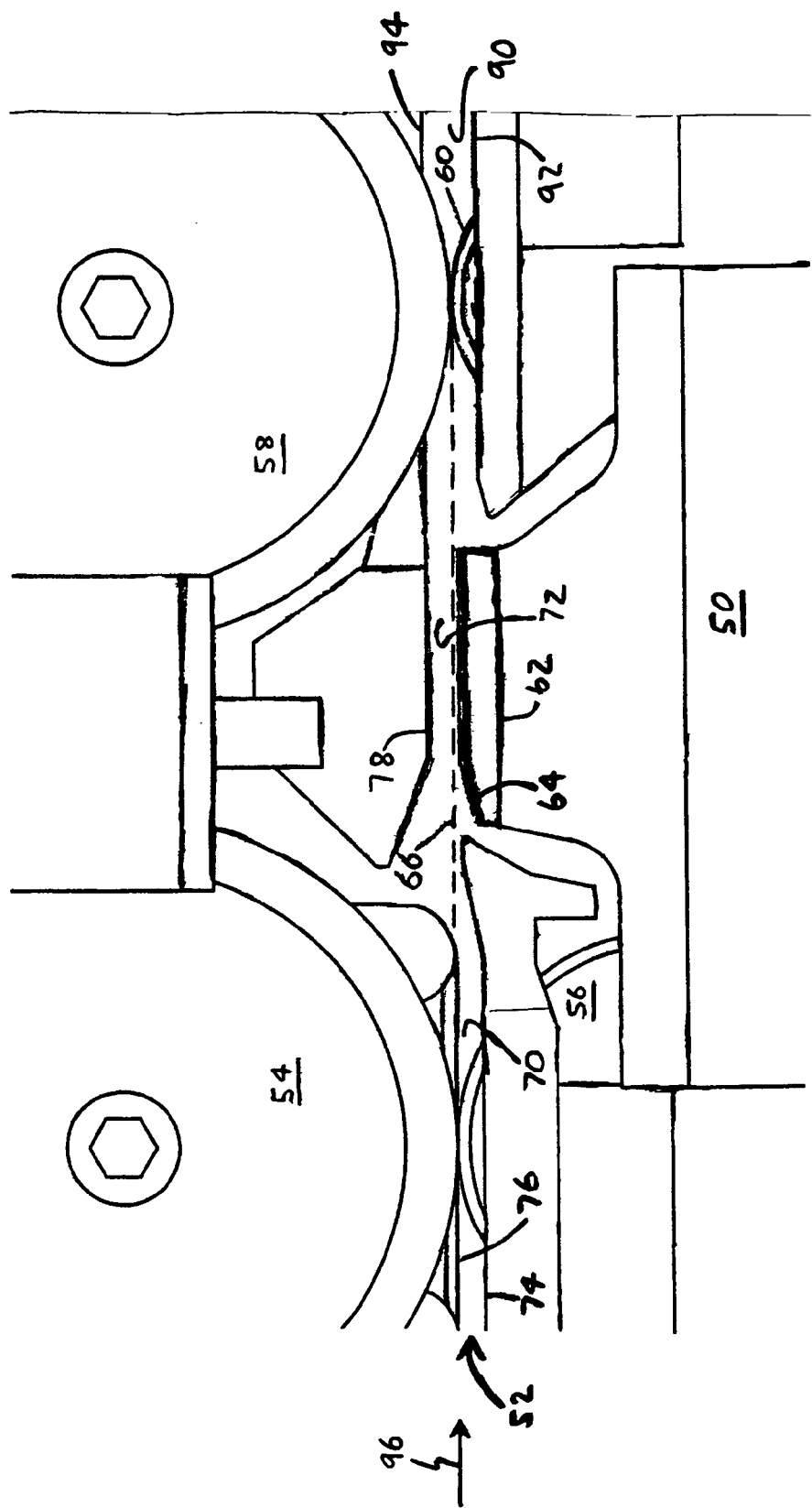
FIG. 2 is a top view of an image camera and the document transport/camera interface in the preferred embodiment of the invention.
Figure 3:
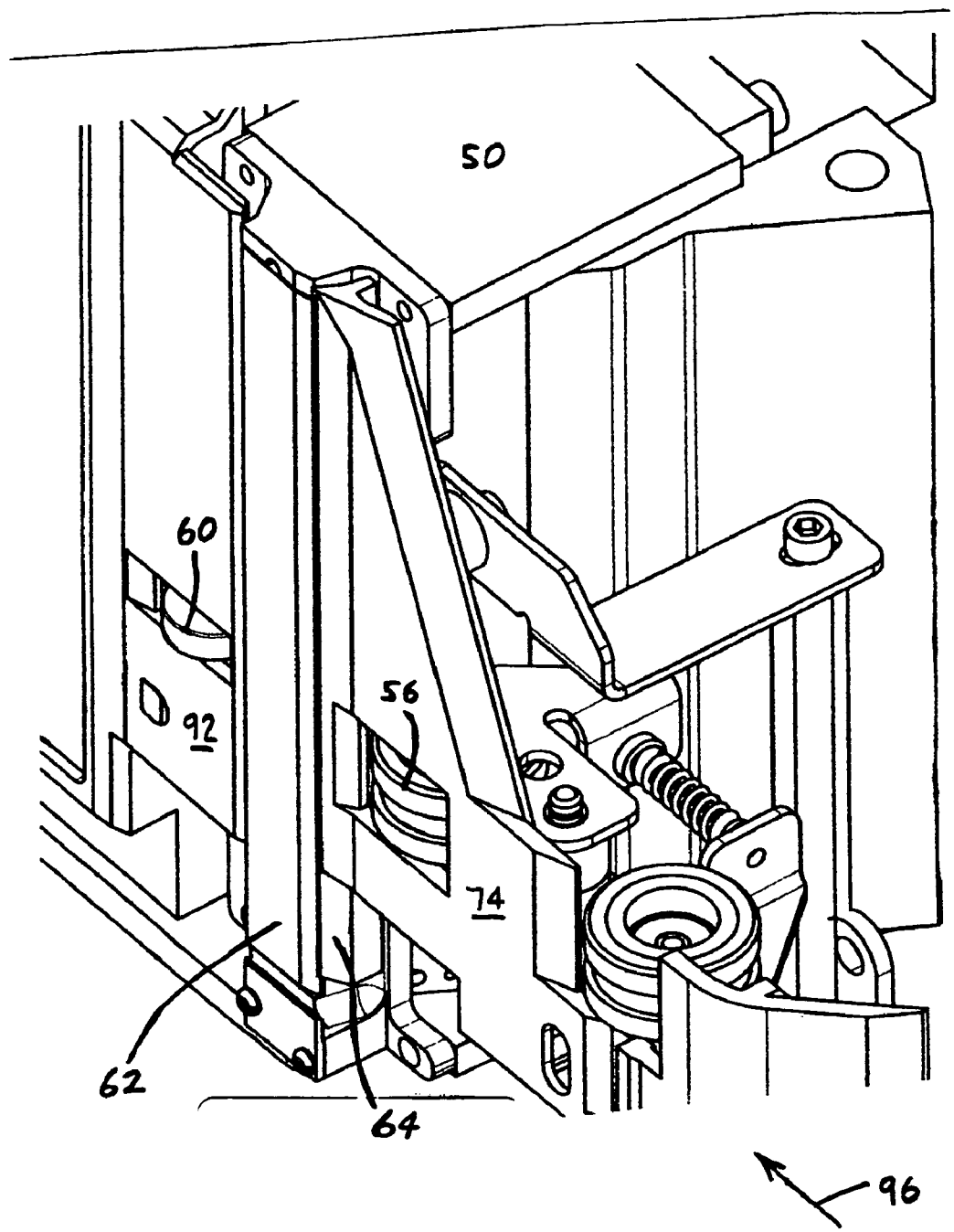
FIG. 3 is a perspective view showing the document transport/camera interface in the preferred embodiment of the invention.

FIG. 2 illustrates the top view of the image camera and the document transport/image camera interface, in the preferred embodiment of the invention, for the imaging device 24 of the document processing system 10. FIG. 3 shows a perspective view of the document transport/image camera interface in the preferred embodiment of the invention. With reference to FIGS. 2 and 3, an image camera 50 performs document imaging of documents that are conveyed through the document track 52 past image camera 50. To transport the documents through the track 52, the system includes upstream drive roller 54 and upstream pinch roller 56. Further, the system includes downstream drive roller 58 and downstream pinch roller 60. Preferably, the drive and pinch roller pairs are positioned as close as possible to the image camera 50. The center of the document path between the drive and pinch roller pairs is indicated in dashed line at 66.

Image camera 50 views the passing document through a window 62 that is preferably made of glass. Window 62 is bonded on the optical path of camera 50 to form the document transport/camera interface. Window 62 has a shallow lead-in angle 64 ground on the upstream side to prevent upset of a passing document. The camera interface is positioned proud into the document path of the transport; window 62 extends into the document path as observed when comparing the position of upstream track section 70 to camera area track section 72, with respect to dashed line 66 which indicates the center of the document path between the drive and pinch roller pairs. A typical path width for a track section is between 0.040 and 0.150 inches.

With continuing reference to FIGS. 2 and 3, upstream track section 70 is composed of track walls 74 and 76. Camera area track section 72 is composed of glass window 62 and track wall 78. Finally, downstream track section 90 is composed of track wall 92 and track wall 94. Documents are conveyed through the track, in the direction of arrow 96, past image camera 50 for imaging.

In operation, in the preferred embodiment, a plurality of different features cause some of the passing documents to wipe the camera glass 62, thereby reducing dust accumulation. In one aspect of the preferred embodiment, as a document passes image camera 50, the passing document leading end enters the downstream drive and pinch rollers 58 and 60, respectively. When a document does not enter the roller pair at the exact pinch point between the downstream drive roller 58 and the downstream pinch roller 60, the result is a momentary shock to the document. This shock sends a ripple along the length of the document, which wipes the document across the image camera glass 62.

In another aspect of the preferred embodiment, when a document trailing end is released from upstream drive roller 54 and upstream pinch roller 56, the trailing end is freed from the pinch force of upstream pinch roller 56. This release action may cause the document to whip the trailing edge within camera track section 72 to wipe camera glass 62.

In another aspect of the preferred embodiment, the offset of upstream drive roller 54 and upstream pinch roller 56 with respect to camera track section 72 and camera glass 62 biases the document toward angled lead-in 64 on camera glass 62, resulting in further wiping action of the passing document against camera glass 62.

The preferred embodiment of the invention illustrated in the drawings includes several aspects that urge the passing document to wipe the camera glass 62. It is understood by those of ordinary skill in the art that it is not necessary for every document to wipe the camera glass 62 at the transport/camera interface. In a document processing system of the type in which a large number of documents are rapidly, continuously, and singly transported past the image camera 50, the system is arranged such that enough documents wipe the camera glass 62 to prevent dust build up as compared to a conventional arrangement. It is appreciated that the document processing system may include any number of image cameras constructed with a document transport/camera interface in accordance with the invention.

While embodiments of the invention have been illustrated and described, it is not intended that these embodiments illustrate and describe all possible forms of the invention.

Rather, the words used in the specification are words of description rather than limitation, and it is understood that various changes may be made without departing from the spirit and scope of the invention.

What is claimed is:

1. A document processing system, the document processing system comprising:
 a feeder stage for feeding documents;
 a transport stage downstream of the feeder stage for receiving the fed documents, the transport stage including a document transport track defining a document transport path along which the documents are conveyed, the transport stage further including an image camera located along the document transport track for performing document imaging, the document transport track including a camera window at the image camera to allow the image camera to view passing documents;
 wherein the camera window has a generally planar top that is positioned proud into the document transport path to facilitate wiping of the camera window with the passing documents and an upstream side of the camera window is chamfered to define a lead-in angle with respect to the generally planar top so as to avoid upsetting the passing documents, and wherein the camera window, including the lead-in angle thereof, are unitary and consist of the same material.

2. The document processing system of claim 1 wherein the document transport path width is between 0.040 and 0.150 inches.

3. The document processing system of claim 1 further comprising: an upstream drive roller for driving documents along the transport track toward the image camera; and an upstream pinch roller paired with the upstream drive roller for driving the documents.

4. The document processing system of claim 3 further comprising: a downstream drive roller for driving documents along the transport track from the image camera; and a downstream pinch roller paired with the downstream drive roller for driving the documents.

5. The document processing system of claim 1 wherein the camera window is made of glass.

6. An imager assembly for use in a document transport, the document transport including a document transport track defining a document transport path along which the documents are conveyed, the imager assembly comprising:
 an image camera located along the document transport track for performing document imaging, the document transport track including a camera window at the image camera to allow the image camera to view passing documents;
 wherein the camera window has a generally planar top that is positioned proud into the document transport path to facilitate wiping of the camera window with the passing documents, wherein an upstream side of the camera window is chamfered to define a lead-in angle so as to avoid upsetting the passing documents, and wherein the camera window, including the lead-in angle thereof, are unitary and consist of the same material.

7. The imager assembly of claim 6 wherein the document transport path width is between 0.040 and 0.150.

8. The imager assembly of claim 6 further comprising: an upstream drive roller for driving documents along the transport track toward the image camera; and an upstream pinch roller paired with the upstream drive roller for driving the documents.

9. The imager assembly of claim 8 further comprising:
 a downstream drive roller for driving documents along the transport track from the image camera; and a downstream pinch roller paired with the downstream drive roller for driving the documents.

10. The imager assembly of claim 6 wherein the camera window is made of glass.

11. A method of configuring a document processing system, the document processing system including a feeder stage for feeding documents, and a transport stage downstream of the feeder stage for receiving the fed documents, the transport stage including a document transport track defining a document transport path along which the documents are conveyed, the transport stage further including an image camera located along the document transport track for performing document imaging, the document transport track including a camera window at the image camera to allow the image camera to view passing documents, wherein the camera window has as generally planar top, the method comprising:
 positioning the camera window proud into the document transport path to facilitate wiping of the camera window with the passing documents; and
 providing an upstream side of the camera window with a chamfer to define a lead-in angle with respect to the generally planar top so as to avoid upsetting the passing documents during operation of the document processing system, and wherein the camera window, including the lead-in angle thereof, are unitary and consist of the same material.

12. The method of claim 11 wherein the camera window is made of glass.

* * * * *